July 27, 1926.
C. L. PAULUS
1,594,068
ILLUMINATING DEVICE FOR USE ON UNIT GUN SIGHTS
Filed June 9, 1923   2 Sheets-Sheet 1
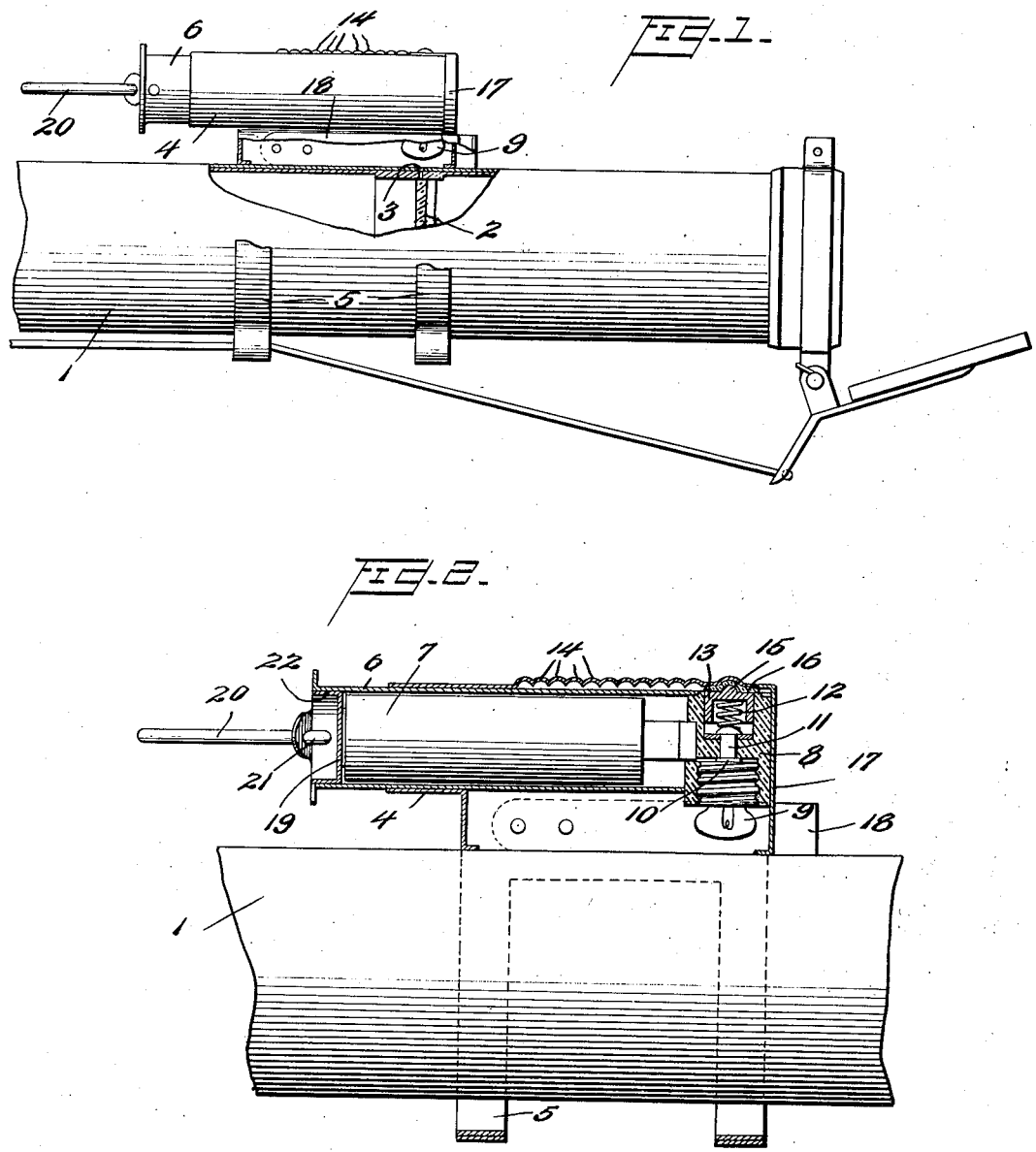
Inventor
C. L. Paulus
By Robert H. Young
Attorney July 27, 1926. 1,594,068
C. L. PAULUS
ILLUMINATING DEVICE FOR USE ON UNIT GUN SIGHTS
Filed June 9, 1923 2 Sheets-Sheet 2
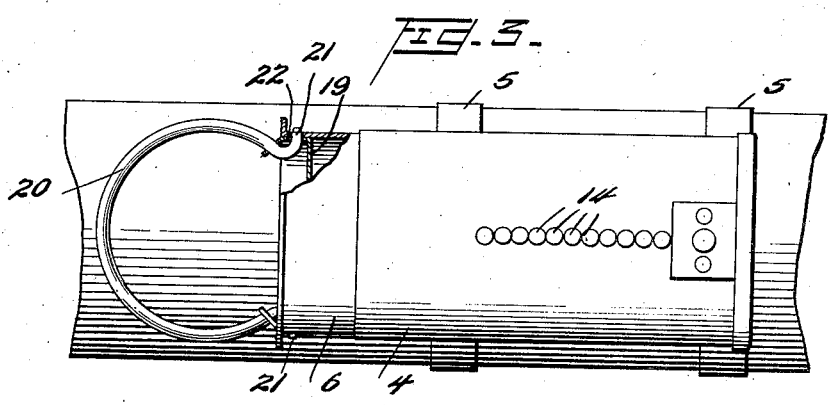
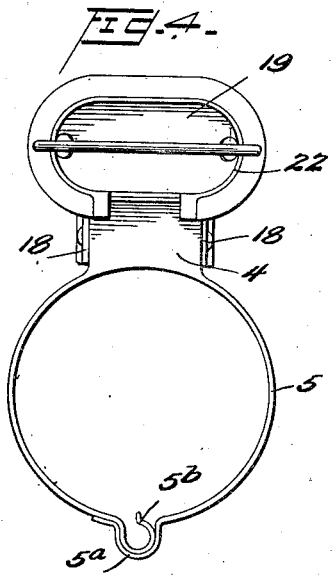
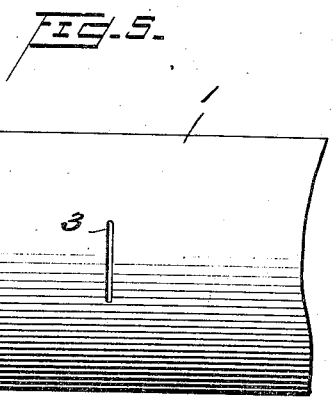
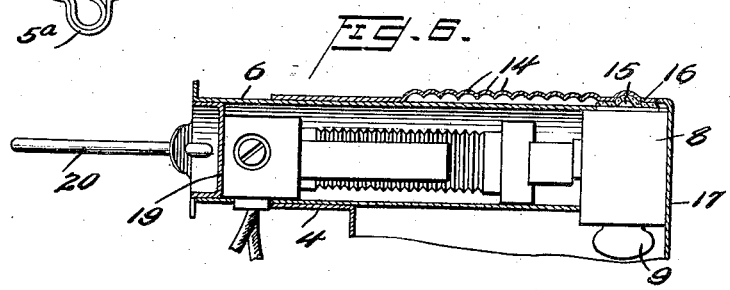
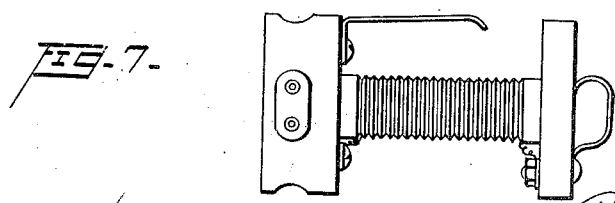
Inventor
C. L. Paulus
By Robert H. Young
Attorney Patented July 27, 1926.

1,594,068

UNITED STATES PATENT OFFICE.

CHARLES L. PAULUS, OF DAYTON, OHIO.

ILLUMINATING DEVICE FOR USE ON UNIT GUN SIGHTS.

Application filed June 9, 1923. Serial No. 644,453.

This invention relates to an illuminating device for use on a unit gun sight.

The object of the invention is to provide for the illumination of the reticle of an aerial machine gun sight and also for varying the intensity or degree of illumination of the reticle.

With the above and other objects in view, the invention consists in the novel construction, combination and arrangement herein fully described, shown and claimed.

In the accompanying drawings,

Figure 1 is a side elevation of a gun sight, showing the reticle illuminating means partly in elevation and partly in longitudinal section.

Figure 2 is an enlarged vertical longitudinal section through the illuminating means.

Figure 3 is a plan view thereof showing also a fragment of the sight tube.

Figure 4 is an end view thereof.

Figure 5 is a fragmentary plan view of the sight tube showing the form of the illuminating orifice therein.

Figure 6 is a view similar to Figure 2 showing the interchangeable use of an electric resistance element in place of the battery shown in Figure 2.

Figure 7 is a plan view of the electric resistance element shown in Figure 6.

Referring now to the drawings, 1 designates the tube or barrel of a gun sight such as is used upon aerial machine guns, said sight tube having a reticle glass 2 therein.

In carrying out the present invention, the tube 1 is formed in the top wall thereof with an illuminating orifice 3 shown in the form of a slit extending transversely of the tube as best shown in Figure 5. Mounted exteriorly of the tube 1 is a housing 4, which covers the orifice 3. The housing 4 extends longitudinally with respect to the tube 1 and is substantially elliptical in cross section as shown in Figure 4, adapting it to enclose a two volt electric bulb or lamp and a two cell battery for use in connection with said lamp.

The housing 4 is detachably mounted upon the tube 1 and capable of being quickly associated therewith and removed therefrom by means of substantially semi-circular spring bands 5, which are fixedly secured to the housing 4 and nave at their extremities interfitting spring clasp portions 5ª and 5ᵇ as best shown in Figure 4, for the purpose above stated. Removably fitted in the housing 4 is a correspondingly shaped container 6 enclosing the battery cells 7 and a lamp socket 8 for the electric lamp or bulb 9. The socket 8 extends transversely of the container 6 and is mounted in one end thereof. The bulb 9 has a center contact 10 which bears electrically against a metal stud or rivet 11 mounted in the socket 8. The current from the lamp passes through a spring 12 to an inverted cup shaped plunger 13 also mounted in the container 6. The function of the plunger 13 is not only to complete the electrical circuit but to maintain the position of the container 6 in the housing 4. To this end the housing 4 is formed with a rack face or series of notches 14 adapted to be engaged by a small projection 15 on the plunger 13. Thus the lamp circuit is maintained throughout the adjustment of the container 6 except at one end of the movement of the container when the projection 15 engages an insulated insert 16 in the housing 4, which thereby breaks the circuit.

When the lamp 9 is very near the slit 3, the illumination is greatest and as the lamp 9 is moved away from the slit 3 by sliding the container 6, the illumination decreases, this being important in that it permits the degree or intensity of the illumination of the reticle to be varied to suit day and night conditions.

A closure or cover plate 17 is detachably mounted on one end of the housing 4 and is retained in place by a pair of spring catches 18 secured to opposite sides of the housing 4 and normally bearing against the outer face of the plate 17. The container 6 has a removable plug 19 fitted in one end thereof and fastened in place by means of a bale shaped operating handle 20, the terminals of which are bent outwardly to form locking pins 21 which are inserted through holes in the flange 22 of the plug 19 and corresponding holes in the container 6.

In case the aircraft upon which the sight is installed is equipped with a storage battery, the two-volt dry cell battery 7 may be replaced by a resistance unit shown in Figures 6 and 7. Such resistance unit is constructed in such a way as to be an exact duplicate in size and shape of the two cell dry battery, and its function is to reduce the 12-volt storage battery current to the two-volt current required by the lamp.

It will be observed that the slit 3 in the wall of the sight tube is in such position as to bring it exactly above the reticle glass. In this position the illumination or rays of light pass through the reticle glass longitudinally, the light being interrupted by the engraved lines used on the reticle.

Variation of the amount of illumination is obtained by moving the electric lamp toward and away from the slit in the sight tube. This has been found to give a finer variation than can be obtained by the use of resistance, or the dimming of the light. The details of construction above described permit the entire mechanism to be disassembled without the use of tools and to be quickly mounted upon and demounted from the sight tube.

I claim:

1. A gun sight tube having a reticle glass therein and also having a lateral light admission orifice adapted to admit and direct light longitudinally through the reticle, a housing arranged exteriorly of said tube and over said orifice, an electric lamp movable in said housing to vary the degree of illumination of the reticle, and means for shifting said lamp, means controlled by the shifting of said lamp adapted to open and close said lamp circuit.

2. A gun sight tube having a reticle glass therein and also having a lateral light admission orifice adapted to admit and direct light longitudinally through the reticle, a housing arranged exteriorly of said tube and over said orifice, an electric lamp movable in said housing to vary the intensity of the light transmitted to the reticle, means for shifting said lamp, a rack face in said housing, and a yieldable detent member shiftable with the lamp and adapted to engage said rack face.

3. A gun sight tube having a reticle glass therein and also having a lateral light admission orifice adapted to admit and direct light longitudinally through the reticle, a housing arranged exteriorly of said tube and over said orifice, an illuminating lamp movable in said housing and adjustable in relation to said orifice, a detachable closure for said housing and spring means for holding said closure in place.

4. A gun sight tube having a reticle glass therein and also having a lateral light admission orifice adapted to admit and direct light longitudinally through the reticle, a housing arranged exteriorly of said tube and over said orifice, an illuminating lamp movable in said housing and adjustable in relation to said orifice, an electric element container slidable in said housing, an end plug for said container, and a spring handle for sliding said container and having means to fasten said plug in the container.

5. A gun sight tube having a reticle glass therein and also having a lateral light admission orifice adapted to admit and direct light longitudinally through the reticle, a housing arranged exteriorly of said tube and over said orifice, an electric lamp movable in said housing to vary the intensity of the light transmitted to the reticle, means for shifting said lamp, a rack face in said housing, and a yieldable detent member shiftable with the lamp and adapted to engage said rack face and also adapted to open and close the lamp circuit.

6. A gun sight tube having a reticle glass therein an also having a light admission orifice, a housing on said tube positioned over said orifice, electric illuminating means movable in said housing and means for shifting said illuminating means in said housing to move the same to and from said orifice and means controlled by the shifting of said lamp adapted to open and close said lamp circuit.

In testimony whereof I affix my signature.
CHARLES L. PAULUS.